United States Patent
Koskela et al.

(10) Patent No.: US 11,291,074 B2
(45) Date of Patent: Mar. 29, 2022

(54) RADIO BEAM MANAGEMENT REPORTING OPERATION WITH CONNECTED MODE DISCONTINUOUS RECEPTION

(71) Applicant: Nokia Technologies Oy, Espoo (FI)

(72) Inventors: Timo Koskela, Oulu (FI); Jorma Kaikkonen, Oulu (FI); Sami Hakola, Kempele (FI)

(73) Assignee: Nokia Technologies Oy, Espoo (FI)

( * ) Notice: Subject to any disclaimer, the term of this patent is extended or adjusted under 35 U.S.C. 154(b) by 4 days.

(21) Appl. No.: 16/644,381

(22) PCT Filed: Sep. 5, 2018

(86) PCT No.: PCT/IB2018/056782
§ 371 (c)(1),
(2) Date: Mar. 4, 2020

(87) PCT Pub. No.: WO2019/049047
PCT Pub. Date: Mar. 14, 2019

(65) Prior Publication Data
US 2021/0112622 A1    Apr. 15, 2021

Related U.S. Application Data

(60) Provisional application No. 62/556,026, filed on Sep. 8, 2017.

(51) Int. Cl.
*H04W 76/28* (2018.01)
*H04B 7/06* (2006.01)
(Continued)

(52) U.S. Cl.
CPC .......... *H04W 76/28* (2018.02); *H04B 7/0617* (2013.01); *H04W 72/042* (2013.01); *H04W 72/1284* (2013.01); *H04W 72/14* (2013.01)

(58) Field of Classification Search
CPC .............. H04W 76/28; H04W 72/042; H04W 72/1284; H04W 72/14; H04B 7/0617
See application file for complete search history.

(56) References Cited

U.S. PATENT DOCUMENTS

2016/0192433 A1* 6/2016 Deenoo ............... H04W 72/046
370/329
2017/0208523 A1* 7/2017 Yang .................. H04W 36/0088
(Continued)

FOREIGN PATENT DOCUMENTS

EP    3337055 A1    6/2018

OTHER PUBLICATIONS

Office action received for corresponding European Patent Application No. 18786394.9, dated Dec. 17, 2020, 7 pages.
(Continued)

*Primary Examiner* — Jael M Ulysse
(74) *Attorney, Agent, or Firm* — Nokia Technologies Oy

(57) ABSTRACT

Systems, methods, apparatuses, and computer program products for beam management reporting in connected mode discontinuous reception (C-DRX) are provided. One method may include configuring, by a network node, a user equipment with a timer that may be started when user equipment active time starts. The method may also include, while the configured timer is running, preventing the user equipment from generating a beam management report autonomously.

25 Claims, 5 Drawing Sheets

(51) Int. Cl.
*H04W 72/04* (2009.01)
*H04W 72/12* (2009.01)
*H04W 72/14* (2009.01)

(56) References Cited

U.S. PATENT DOCUMENTS

| | | | |
|---|---|---|---|
| 2017/0251518 A1* | 8/2017 | Agiwal | H04W 76/28 |
| 2017/0367069 A1* | 12/2017 | Agiwal | H04W 68/005 |
| 2018/0006770 A1* | 1/2018 | Guo | H04L 1/1822 |
| 2018/0020382 A1* | 1/2018 | Kim | H04W 36/0055 |
| 2018/0167883 A1* | 6/2018 | Guo | H04W 72/046 |
| 2019/0053162 A1* | 2/2019 | Islam | H04W 52/0229 |
| 2019/0059129 A1* | 2/2019 | Luo | H04W 52/0216 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321, V14.3.0, Jun. 2017, pp. 1-107.
International Search Report and Written Opinion received for corresponding Patent Cooperation Treaty Application No. PCT/IB2018/056782, dated Dec. 19, 2018, 11 pages.
"Consideration on Beam Management with C-DRX", 3GPP TSG-RAN WG2 meeting #98, R2-1704863, Agenda: 10.2.9, Huawei, May 15-19, 2017, 4 pages.
"UE Power Saving Mechanism in High Frequency", 3GPP TSG-RAN WG2 meeting #96, R2-167875, Agenda: 9.2.2.4, Huawei, Nov. 14-18, 2016, 2 pages.
Office action received for corresponding European Patent Application No. 18786394.9, dated Jan. 27, 2022, 7 pages.

\* cited by examiner

RADIO BEAM MANAGEMENT REPORTING OPERATION WITH CONNECTED MODE DISCONTINUOUS RECEPTION

RELATED APPLICATIONS

This application was originally filed as PCT Application No. PCT/IB2018/056782, filed on Sep. 5, 2018, which claims priority from U.S. Provisional Application No. 62/556,026, filed on Sep. 8, 2017.

BACKGROUND

Field

Embodiments of the invention generally relate to wireless or cellular communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate to NR physical layer design, for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity (DC).

Long Term Evolution (LTE) or E-UTRAN improved efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method that may include configuring, by a network node, a UE with a timer that is started when the UE active time starts. While the configured timer is running, the UE is prevented from forming and/or generating a BM report autonomously.

Another embodiment is directed to an apparatus that may include at least one processor and at least one memory including computer program code. The at least one memory and the computer program code may be configured, with the at least one processor, to cause the apparatus at least to configure a UE with a timer that is started when the UE active time starts. While the configured timer is running, the UE is prevented from forming and/or generating a BM report autonomously.

Another embodiment is directed to a method that may include receiving, at a UE, a configuration for a timer that is started when the UE active time starts. While the timer is running, the UE is prevented from forming and/or generating a BM report autonomously.

Another embodiment is directed to an apparatus that may include at least one processor and at least one memory including computer program code. The at least one memory and the computer program code may be configured, with the at least one processor, to cause the apparatus at least to receive a configuration for a timer that is started when the apparatus active time starts. While the timer is running, the apparatus is prevented from forming and/or generating a BM report autonomously.

BRIEF DESCRIPTION OF THE DRAWINGS

For proper understanding of the invention, reference should be made to the accompanying drawings, wherein.

DETAILED DESCRIPTION

Figure 1:
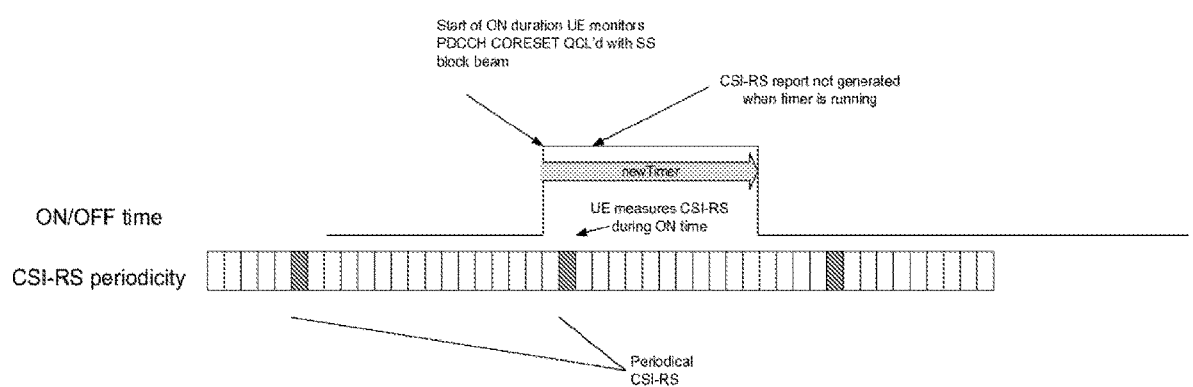
FIG. 1 illustrates an example block diagram according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products relating to beam management reporting in connected mode discontinuous reception (C-DRX), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As mentioned above, certain embodiments relate to 3GPP NR physical layer design. More specifically, some embodiments are directed to UE behaviour when performing beam management reports while configured with connected mode discontinuous reception (C-DRX).

LTE C-DRX was designed to allow a UE to monitor physical downlink control channel (PDCCH) in a discontinuous manner according to the rules and parameters defined in 3GPP TS 36.321, Section 5.7. When a UE is not required to monitor PDCCH, it may turn off its receiver hardware and reduce the receiver power consumption. According to certain embodiments, a drx-InactivityTimer parameter determines how soon after the ceasing of downlink (DL) and/or uplink (UL) activity the UE may start to apply the discontinuous PDCCH monitoring. Once the drx-InactivityTimer has expired, the UE may be required to monitor the PDCCH only during onDurationTimer once every DRX cycle. Two different DRX cycles can be configured, shortDRX-Cycle (optional) and longDRX-Cycle. The PDCCH discontinuous monitoring pattern according to shortDRX-Cycle may be applied first (if configured) and may be followed by longDRX-Cycle. The onDurationTimer may determine the minimum active time that a UE needs to monitor the PDCCH (unless not required by other rules) every DRX cycle. When there is no shortDRX-Cycle defined or the drxShortCycleTimer (determining how soon after applying short DRX cycle UE may start to use long DRX cycle) has expired, the UE may start to monitor PDCCH in a discontinuous manner according to longDRX-Cycle. Another relevant rule in the context of certain embodiments is that if the UE is indicated by the PDCCH a new transmission (either in DL or in UL), the UE may need to re-start the drx-InactivityTimer.

It is noted that, according to 3GPP agreements on DRX for NR, a medium access control (MAC) entity can be in one DRX state (i.e., single on/off time) at any given time, but it is yet to be determined if multiple configuration are supported. When a MAC entity is awake, it may monitor "PDCCH" occasion. In NR, a DRX configuration is described by at least the following configuration parameters: an on duration time, an inactivity time, a retransmission time, short DRX cycles, long DRX cycles.

When a UE starts to monitor a new radio dedicated physical control channel (NR-DPCCH) (i.e., due to configured onDuration) and it has been configured, for example, with channel state information reference signal (CSI-RS) resource for beam management (BM), it should in principle trigger a BM report at least during the active time. This would in turn result in a scheduling request (SR), which would trigger additional C-DRX timers prolonging the UE active time. If the network (NW) has large amount of data to transmit in DL or UE has other data to send in UL, this may not be harmful, as it would not prolong the active time unnecessarily. The triggered reports could be used for beam management. However, if the NW nor the UE has any actual data to transmit, or there is only very limited amount of data to be delivered, prolonging the active time and increasing UL traffic due to the measurement reports, would not be desirable.

It is noted that, in context of this disclosure, CSI-RS is used as one example of the beam management RS that a UE needs to monitor and/or measure, and that additional examples are possible according to other embodiments. It should also be noted that synchronization signal (SS) Block could be configured to be used as a beam management RS. Thus, the problem would arise if the UE active time collides/overlaps with the SS block transmission, resulting or triggering a BM report and prolonging the active time unnecessarily.

According to an embodiment, a UE may be configured with a timer that may be started at the beginning of when the UE active time starts (e.g., 'onDurationTimer'). For example, in certain embodiments, the network may configure the UE with a timer that may be started when the UE active time according to the DRX cycle starts (e.g., when the 'onDurationTimer' starts). In other words, the UE may be configured with a timer that may be started when the UE starts to monitor PDCCH according to the DRX cycle.

While this aforementioned timer is running, the UE may not be allowed to form and/or shall not generate a BM report autonomously. If the UE is provided with valid UL allocation/grant by the NW, then the UE may be allowed to form and/or shall generate a BM report and send it in UL. For example, the UE may send the BM report potentially piggybacked with other data, for example, using a MAC control element (CE). In one embodiment, the BM report may be formed and sent, for example, if it can be sent on a physical uplink shared channel (PUSCH) allocation given for other purposes, or if it can be sent on a physical uplink control channel (PUCCH) allocation. According to certain embodiments, once the configured timer expires and the UE is still on active time monitoring PDCCH (due to other C-DRX timers), the UE may be allowed to form (and/or transmit) a separate measurement report, and proceed to send SR to obtain UL resources accordingly.

In one embodiment, determined by BM measurement report message size or predefined payload size threshold, the UE would not be allowed to form and/or send the BM report unless the allocation provided by the network, e.g. for PUCCH or PUSCH, does not exceed a certain threshold that meets the payload requirement set by the BM report. In one alternative or additional embodiment, if the UE has a valid PDCCH beam configuration and the CSI-RS measurement result indicates that CSI-RS corresponding to the current PDCCH beam is still the highest quality (or within an offset), the UE does not generate the beam report if no other UL data is in the buffer and the timer has expired and the UE is in ON duration. According to another embodiment, the BM report may be configured to be of limited form and/or size during the configured timer, for example so that limited number of beams are reported.

According to one possible embodiment, the configured timer may prevent the UE from triggering/sending an SR, due to BM report (or in general). In this embodiment, if the UE needs to send a SR due to other reasons, e.g., SR is triggered due to other user plane data or control message(s) that arrived to transmission buffer or were generated. In case the UE has multiple SR configuration where different SR signals can indicate the potential payload size/buffer status of UE UL buffer, the UE would be allowed to account the payload required by BM report, when calculating the payload size to be indicated by SR. If the UE receives an allocation of UL grant by the NW, the UE may transmit the BM report along with, e.g., buffer status report (BSR) and potentially user plane data. In this case, the UE may prioritize BM report over BSR report and user plane data if the UL grant size is not sufficient.

In another embodiment, the UE may be provided with a MAC or PDCCH order to reset the timer (to prolong the time UE is prohibited to send a report) or to skip the timer and be allowed to form and/or generate a BM report. According to an embodiment, the NW may use UL grant (of sufficient size) to poll the UE to provide the BM report. For example, the NW may provide a small PUCCH allocation (e.g., only ACK/NACK, for limited BM reporting such that UE is configured to report the highest quality CSI-RS resource), that should not result in BM report during the timer, but if the allocation is sufficiently large, the BM could be (formed and) sent.

In one possible embodiment, the UE may not be allowed to send and/or form a BM report unless the 'drx-Inactivity-Timer' is running. In other words, in this embodiment, a prerequisite for beam reporting is that the UE has received DL allocation. In one additional embodiment, the UE may not be allowed to send and/or form a BM report when the 'onDurationTimer' is running, but only after it has expired and the UE is still on active time (due to some other C-DRX timer/procedure).

FIG. 1 illustrates an example block diagram according to one embodiment. In the example illustrated in FIG. 1, during ON duration, the UE monitors PDCCH. In this embodiment, if the UE has not detected any PDCCH activity on the monitored radio network temporary identifier (RNTI) or cell radio network temporary identifier (C-RNTI) and no uplink data is currently in the buffer (i.e., no BSR triggered) and the UE has measured CSI-RS during the ON duration, the UE does not generate a beam report.

Figure 2:
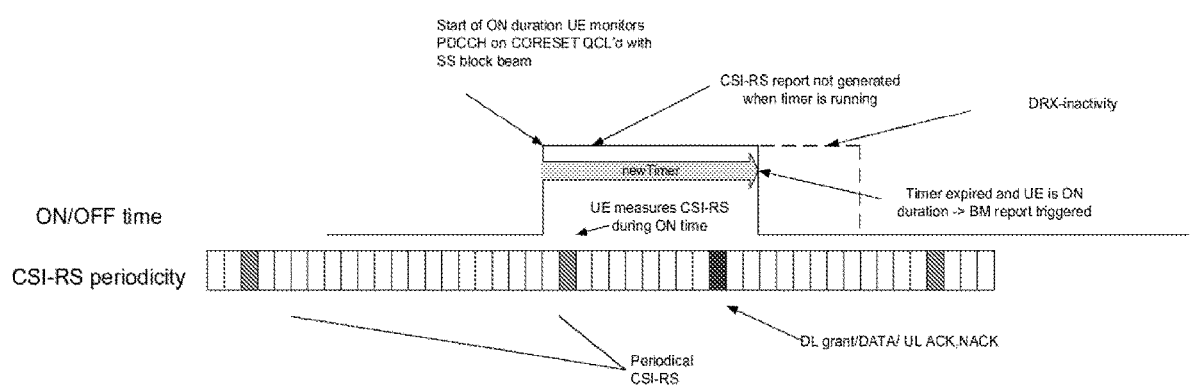
FIG. 2 illustrates an example block diagram according to another embodiment.

FIG. 2 illustrates an example block diagram according to another embodiment. In the example of FIG. 2, the UE has received DL grant. For example, as illustrated in FIG. 2, the UE may receive the DL grant while the 'newTimer' is running. In this example, when the timer expires and the UE is not in DRX, the UE may generate the beam management report.

Figure 3:
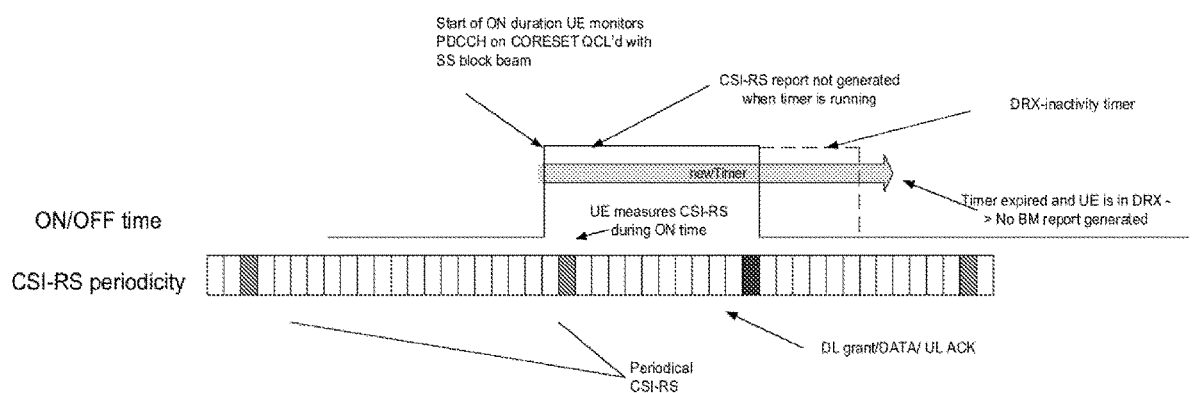
FIG. 3 illustrates an example block diagram according to another embodiment.

FIG. 3 illustrates an example block diagram according to another embodiment. In the example of FIG. 3, the UE receives DL grant and only a limited UL grant and the UE has no other UL data in the buffer (i.e., no need for SR). Accordingly, in the example embodiment depicted in FIG. 3, the UE does not generate a beam management report while the timer is running and the UE is not in DRX.

Figure 4A:
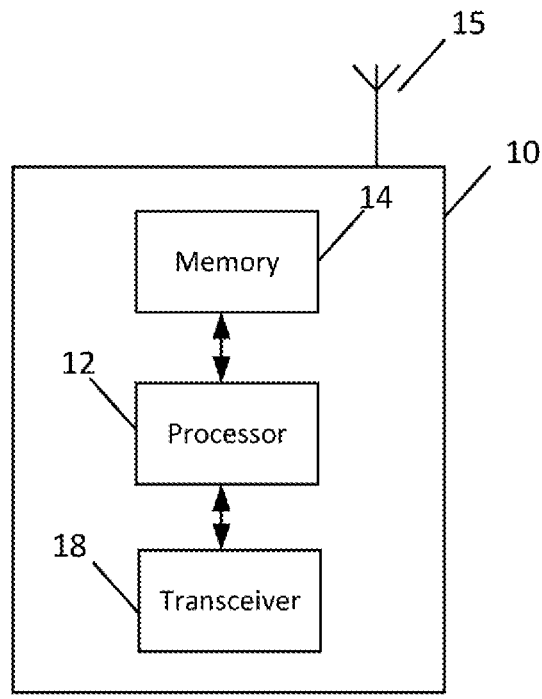
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), or subscription server associated with a radio access network, such as a GSM network, LTE network, 5G or NR.

It should be understood that apparatus 10 may be comprised of an edge cloud server as a distributed computing system where the server and the radio node may be standalone apparatuses communicating with each other via a radio path or via a wired connection, or they may be located in a same entity communicating via a wired connection. It should be noted that one of ordinary skill in the art would understand that apparatus 10 may include components or features not shown in FIG. 4a.

As illustrated in FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), Multe-Fire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein.

In one embodiment, apparatus 10 may be controlled by memory 14 and processor 12 to configure a UE with a timer that may be started when the UE active time according to the DRX cycle starts (e.g., when the 'onDurationTimer' starts). While the configured timer is running, the UE may not be allowed to form and/or generate a BM report autonomously.

If or when apparatus 10 provides the UE with a valid UL allocation or grant, then the UE may be allowed to form and/or generate a BM report. In this case, apparatus 10 may be controlled by memory 14 and processor 12 to receive the BM report from the UE in the UL. For example, in an embodiment, the BM report may be received by apparatus 10 piggybacked with other data, for example, in a MAC CE. In one embodiment, the BM report may be received, for example, on a physical uplink shared channel (PUSCH) allocation that was provided for other purposes, or may be received on a physical uplink control channel (PUCCH) allocation.

According to certain embodiments, once the configured timer expires and the UE is still on active time monitoring PDCCH (e.g., due to other C-DRX timers), the UE may be allowed to form (and/or transmit) a separate measurement report, and proceed to send SR to obtain UL resources accordingly. Therefore, in this embodiment, when the configured timer expires and the UE is still on active time monitoring PDCCH, apparatus 10 may be controlled by memory 14 and processor 12 to receive the BM measurement report and/or SR from the UE.

In one embodiment, determined by BM measurement report message size or predefined payload size threshold, the UE is not allowed to form and/or send the BM report if the provided allocation, e.g. for PUCCH, does not exceed a certain threshold that meets the payload requirement set by the BM report. In one alternative or additional embodiment, if the UE has a valid PDCCH beam configuration and the CSI-RS measurement result indicates that CSI-RS corresponding to the current PDCCH beam is still the highest quality (or within an offset), the UE does not generate the beam report if no other UL data is in the buffer and the timer has expired and the UE is in ON duration. According to another embodiment, apparatus 10 may be controlled by memory 14 and processor 12 to configure the BM report to be of limited form and/or size during the configured timer, for example so that limited number of beams are reported.

According to an embodiment, the configured timer may prevent the UE from sending an SR, due to BM report (or in general). In this embodiment, if the UE needs to send a SR due to other reasons, it may be allowed to account the payload required by the BM report in the SR generation and if allocated UL grant by apparatus 10, piggyback the BM report.

In another embodiment, apparatus 10 may be controlled by memory 14 and processor 12 to provide the UE with a MAC or PDCCH order to reset the timer (to prolong the time UE is prohibited to send a report) or to skip the timer and be allowed to form and/or generate a BM report. According to an embodiment, apparatus 10 may be controlled by memory 14 and processor 12 to use UL grant (of sufficient size) to poll the UE to provide the BM report. For example, apparatus 10 may be controlled by memory 14 and processor 12 to provide a small PUCCH allocation (e.g., only ACK/NACK, for limited BM reporting such that UE is configured to report the highest quality CSI-RS resource), that should not result in BM report during the timer, but if the allocation is sufficiently large, the BM could be (formed and) sent by the UE.

In one embodiment, apparatus 10 may be controlled by memory 14 and processor 12 to configure the UE such that it is not allowed to send and/or form a BM report unless the 'drx-InactivityTimer' is running. In other words, in this embodiment, a prerequisite for beam reporting is that the UE has received DL or/and UL allocation from apparatus 10. In one additional embodiment, apparatus 10 may be controlled by memory 14 and processor 12 to configure the UE such that it is not allowed to send and/or form a BM report when the 'onDurationTimer' is running, but only after it has expired and the UE is still on active time (e.g., due to some other C-DRX timer/procedure).

Figure 4B:
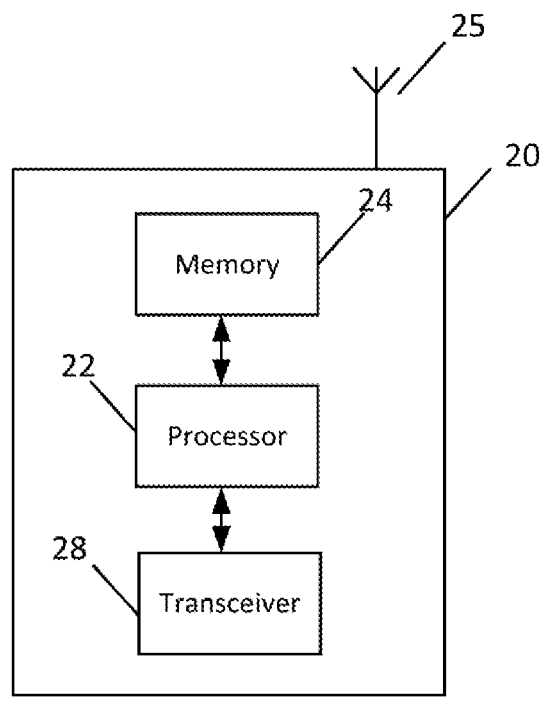
FIG. 4b illustrates a block diagram of an apparatus, according to another embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and any other radio access technologies. It should be noted that one of ordinary skill in the art would understand that apparatus 20 may include components or features not shown in FIG. 4b.

As illustrated in FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein.

According to one embodiment, apparatus 20 may be controlled by memory 24 and processor 22 to receive a configuration for a timer that may be started when the UE active time starts (e.g., 'onDurationTimer'). While the timer is running, apparatus 20 is not allowed to form and/or generate a BM report autonomously. If or when apparatus 20 is provided with valid UL allocation/grant by the NW, then apparatus 20 is allowed to form and/or generate a BM report and send it in UL. For example, in an embodiment, apparatus 20 may be controlled by memory 24 and processor 22 to send the BM report potentially piggybacked with other data, for example, using a MAC CE. In one embodiment, apparatus 20 may be controlled by memory 24 and processor 22 to form and send the BM report, for example, if it can be sent on a physical uplink shared channel (PUSCH) allocation given for other purposes, or if it can be sent on a physical uplink control channel (PUCCH) allocation. According to certain embodiments, once the configured timer expires and apparatus 20 is still on active time monitoring PDCCH (e.g., due to other C-DRX timers), apparatus 20 may be allowed to form (and/or transmit) a separate measurement report, and proceed to send SR to obtain UL resources accordingly.

In one embodiment, determined by BM measurement report message size or predefined payload size threshold, apparatus 20 is not allowed to form and/or send the BM report if the provided allocation, e.g. for PUCCH, does not exceed a certain threshold that meets the payload requirement set by the BM report. In one alternative or additional embodiment, if apparatus 20 has a valid PDCCH beam configuration and the CSI-RS measurement result indicates that CSI-RS corresponding to the current PDCCH beam is still the highest quality (or within an offset), apparatus 20 may be controlled by memory 24 and processor 22 to not generate the beam report if no other UL data is in the buffer and the timer has expired and the UE is in ON duration. According to another embodiment, the BM report may be configured to be of limited form and/or size during the configured timer, for example so that limited number of beams are reported.

According to another embodiment, the configured timer may prevent apparatus 20 from sending an SR, due to BM report (or in general). In this embodiment, if apparatus 20 needs to send a SR due to other reasons, it would be allowed to account the payload required by the BM report in the SR generation and if allocated UL grant by NW, piggyback the BM report.

In another embodiment, apparatus 20 may be controlled by memory 24 and processor 22 to receive a MAC or PDCCH order to reset the timer (to prolong the time UE is prohibited to send a report), or to skip the timer and be allowed to form and/or generate a BM report. According to an embodiment, the NW may use UL grant (of sufficient size) to poll apparatus 20 to provide the BM report. For example, apparatus 20 may be controlled by memory 24 and processor 22 to receive, from the NW, a small PUCCH allocation (e.g., only ACK/NACK, for limited BM reporting such that apparatus 20 is configured to report the highest quality CSI-RS resource), that should not result in BM report during the timer, but if the allocation is sufficiently large, the BM could be (formed and) sent by apparatus 20.

In one possible embodiment, apparatus 20 may not be allowed to send and/or form a BM report unless the 'drx-InactivityTimer' is running. In other words, in this embodiment, a prerequisite for beam reporting is that apparatus 20 has received DL or/and UL allocation. In one additional embodiment, apparatus 20 may not be allowed to send and/or form a BM report when the 'onDurationTimer' is running, but only after it has expired and apparatus 20 is still on active time (due to some other C-DRX timer/procedure).

Figure 5A:
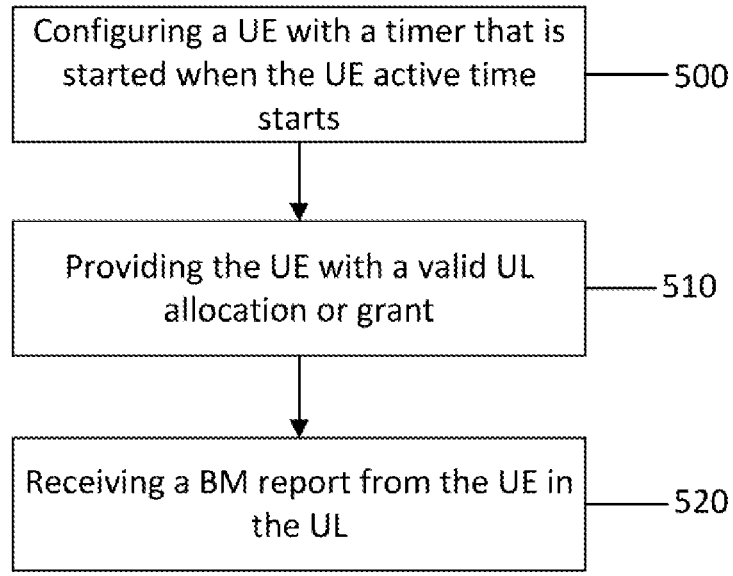
FIG. 5a illustrates an example flow diagram of a method, according to an embodiment.

FIG. 5a illustrates an example flow diagram of a method, according to one example embodiment. The method may be performed by a network node, such as a base station, eNB, gNB, or access node, for example. The method of FIG. 5a may include, at 500, configuring a UE with a timer that may be started when the UE active time according to the DRX cycle starts (e.g., when the 'onDurationTimer' starts). While the configured timer is running, the UE may be prevented from forming and/or generating a BM report autonomously.

In an embodiment, the method may include, at 510, providing the UE with a valid UL allocation or grant, which then allows the UE to form and/or generate a BM report. In this case, the method may include, at 520, receiving the BM report from the UE in the UL after the configured timer expires. For example, in an embodiment, the receiving 520 may include receiving the BM report, by the network node, piggybacked with other data, for example, in a MAC CE. In one embodiment, the receiving 520 may include receiving the BM report, for example, on a physical uplink shared channel (PUSCH) allocation that was provided for other purposes, or receiving the BM report on a physical uplink control channel (PUCCH) allocation.

According to certain embodiments, once the configured timer expires and the UE is still on active time monitoring PDCCH (e.g., due to other C-DRX timers), the UE may be allowed to form (and/or transmit) a separate measurement report, and proceed to send SR to obtain UL resources accordingly. Therefore, in this embodiment, the receiving 520 may include, when the configured timer expires and the UE is still on active time monitoring PDCCH, receiving the BM measurement report and/or SR from the UE.

In one embodiment, determined by BM measurement report message size or predefined payload size threshold, the UE is prevented from forming and/or sending the BM report if the provided allocation, e.g. for PUCCH, does not exceed a certain threshold that meets the payload requirement set by the BM report. In one alternative or additional embodiment, if the UE has a valid PDCCH beam configuration and the CSI-RS measurement result indicates that CSI-RS corresponding to the current PDCCH beam is still the highest quality (or within an offset), the UE does not generate the beam report if no other UL data is in the buffer and the timer has expired and the UE is in ON duration. According to another embodiment, the method may also include configuring the BM report to be of limited form and/or size during the configured timer, for example so that limited number of beams are reported.

According to an embodiment, the configured timer may prevent the UE from sending a SR, due to BM report (or in general). In this embodiment, if the UE needs to send a SR due to other reasons, it may be allowed to account the payload required by the BM report in the SR generation and if allocated UL grant by the network node, piggyback the BM report.

In another embodiment, the method may further include providing the UE with a MAC or PDCCH order to reset the timer (to prolong the time UE is prohibited to send a report) or to skip the timer and be allowed to form and/or generate a BM report. According to an embodiment, the method may also include using UL grant (of sufficient size) to poll the UE to provide the BM report. For example, the method may include the network node providing a small PUCCH allocation (e.g., only ACK/NACK, for limited BM reporting such that UE is configured to report the highest quality CSI-RS resource), that should not result in BM report during the timer, but if the allocation is sufficiently large, the BM could be (formed and) sent by the UE.

In one embodiment, the configuring 500 may include configuring the UE such that it is prevented from sending and/or forming a BM report unless the 'drx-InactivityTimer' is running. In other words, in this embodiment, a prerequisite for beam reporting is that the UE has received DL or/and UL allocation from the network node. In one additional embodiment, the configuring 500 may include configuring the UE such that it is prevented from sending and/or forming a BM report when the 'onDurationTimer' is running, but only after it has expired and the UE is still on active time (e.g., due to some other C-DRX timer/procedure).

Figure 5B:
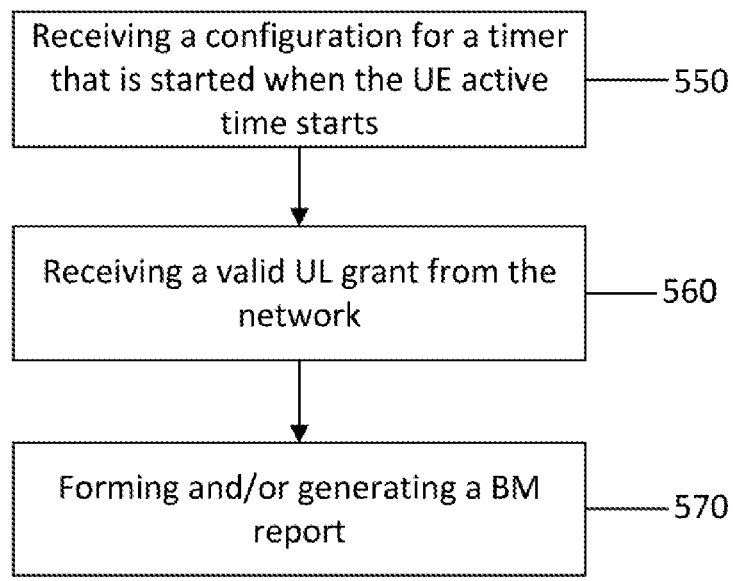
FIG. 5b illustrates an example flow diagram of a method, according to another embodiment.

In an embodiment, FIG. 5*b* illustrates an example flow diagram of a method, according to one example embodiment. The method may be performed by a UE or mobile station, for example. In an embodiment, the method may include, at 550, receiving at a UE a configuration for a timer that may be started when the UE active time according to the DRX cycle starts (e.g., when the 'onDurationTimer' starts). While the timer is running, the UE is prevented from forming and/or generating a BM report autonomously. According to one embodiment, the method may include, at 560, receiving a valid UL allocation or grant from the NW, then the method may include, at 570, forming and/or generating a BM report and sending it in UL. For example, in an embodiment, the method may include sending the BM report potentially piggybacked with other data, for example, using a MAC CE. In one embodiment, the BM report, for example, may be sent on a physical uplink shared channel (PUSCH) allocation given for other purposes, or if it can be sent on a physical uplink control channel (PUCCH) allocation. According to certain embodiments, once the configured timer expires and the UE is still on active time monitoring PDCCH (e.g., due to other C-DRX timers), the forming 570 may include forming (and/or transmitting) a separate BM measurement report, and sending SR to obtain UL resources accordingly.

In one embodiment, determined by BM measurement report message size or predefined payload size threshold, the UE may be prevented from forming and/or sending the BM report if the provided allocation, e.g. for PUCCH, does not exceed a certain threshold that meets the payload requirement set by the BM report. In one alternative or additional embodiment, if the UE has a valid PDCCH beam configuration and the CSI-RS measurement result indicates that CSI-RS corresponding to the current PDCCH beam is still the highest quality (or within an offset), the UE does not generate the beam report if no other UL data is in the buffer and the timer has expired and the UE is in ON duration. According to another embodiment, the BM report may be configured to be of limited form and/or size during the configured timer, for example so that a limited number of beams are reported.

According to another embodiment, the configured timer may prevent the UE from sending a SR, due to the BM report (or in general). In this embodiment, if the UE needs to send a SR due to other reasons, it would be allowed to account the payload required by the BM report in the SR generation and if allocated UL grant by the NW, piggyback the BM report.

In another embodiment, the method may include receiving a MAC or PDCCH order to reset the timer (to prolong the time UE is prohibited to send a report), or to skip the timer and be allowed to form and/or generate a BM report. According to an embodiment, the NW may use UL grant (of sufficient size) to poll the UE to provide the BM report. For example, in this embodiment, the method may include receiving, from the NW, a small PUCCH allocation (e.g., only ACK/NACK, for limited BM reporting such that the UE is configured to report the highest quality CSI-RS resource), that should not result in BM report during the timer, but if the allocation is sufficiently large, the BM may be (formed and) sent by the UE.

In another embodiment, the UE may be prevented from sending and/or forming a BM report unless the 'drx-InactivityTimer' is running. In other words, in this embodiment, a prerequisite for beam reporting is that the UE has received DL or/and UL allocation. In one additional embodiment, the UE may be prevented from sending and/or forming a BM report when the 'onDurationTimer' is running, but only after it has expired and the UE is still on active time (due to some other C-DRX timer/procedure).

In view of the above, embodiments of the invention provide several technical effects and/or improvements and/or advantages. For example, certain embodiments improve beam measurement reporting operation. In addition, certain embodiments improve system performance, for example, by reducing active time and decreasing UL traffic. As a result, certain embodiments can improve performance and throughput of devices and network nodes including, for example, base stations, eNBs, gNBs and/or UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of example embodiments, reference should be made to the appended claims.

We claim:

1. A method, comprising:
   configuring, by a network node, a user equipment with a timer that is started when user equipment active time starts; and
   sending the configuration for the timer to the user equipment, wherein when the configured timer is running, it prevents the user equipment from generating a beam management report autonomously.

2. The method according to claim 1, further comprising:
   providing the user equipment with a valid uplink grant, which allows the user equipment to generate the beam management report; and
   receiving the beam management report from the user equipment in uplink after the configured timer expires.

3. The method according to claim 2, wherein the receiving comprises receiving, by the network node, the beam management report piggybacked with other data in a medium access control (MAC) control element (CE).

4. The method according to claim 2, wherein the receiving comprises:
   receiving the beam management report on a physical uplink shared channel (PUSCH) allocation that was provided for other purposes; or
   receiving the beam management report on a physical uplink control channel (PUCCH) allocation.

5. The method according to claim 2, wherein the receiving comprises, when the configured timer expires and the user equipment is still on active time monitoring physical downlink control channel (PDCCH), receiving at least one of the beam management report or scheduling request (SR) from the user equipment.

6. The method according to claim 1, wherein the configuring comprises configuring the user equipment to be prevented from generating or sending a beam management report unless a 'drx-InactivityTimer' is running.

7. The method according to claim 1, wherein the configuring comprises configuring the user equipment to be prevented from generating or sending a beam management report when an 'onDurationTimer' is running.

8. The method according to claim 1, further comprising configuring the beam management report to be of limited form or size during the configured timer so that a limited number of beams are reported.

9. The method according to claim 1, further comprising providing the user equipment with a medium access control or physical downlink control channel order to reset the configured timer to prolong the time the user equipment is prohibited to send a report or to skip the configured timer and be allowed to generate the beam management report.

10. The method according to claim 1, further comprising using uplink grant of sufficient size to poll the user equipment to provide the beam management report.

11. An apparatus, comprising:
    at least one processor; and
    at least one memory comprising computer program code,
    the at least one memory and computer program code configured, with the at least one processor, to cause the apparatus at least to
    configure a user equipment with a timer that is started when user equipment active time starts; and
    send the configuration for the timer to the user equipment, wherein when the configured timer is running, it prevents the user equipment from generating a beam management report autonomously.

12. The apparatus according to claim 11, wherein the at least one memory and computer program code are further configured, with the at least one processor, to cause the apparatus at least to:
    provide the user equipment with a valid uplink grant, which allows the user equipment to generate the beam management report; and
    receive the beam management report from the user equipment in uplink after the configured timer expires.

13. The apparatus according to claim 12, wherein when receiving, the at least one memory and computer program code are configured, with the at least one processor, to cause the apparatus at least to receive the beam management report piggybacked with other data in a medium access control (MAC) control element (CE).

14. The apparatus according to claim 12, wherein when receiving, the at least one memory and computer program code are configured, with the at least one processor, to cause the apparatus at least to:
    receive the beam management report on a physical uplink shared channel (PUSCH) allocation that was provided for other purposes; or
    receive the beam management report on a physical uplink control channel (PUCCH) allocation.

15. The apparatus according to claim 12, wherein when receiving, the at least one memory and computer program code are configured, with the at least one processor, to cause the apparatus at least to receive, when the configured timer expires and the user equipment is still on active time monitoring physical downlink control channel (PDCCH), at least one of the beam management report or scheduling request (SR) from the user equipment.

16. The apparatus according to claim 11, wherein when configuring, the at least one memory and computer program code are configured, with the at least one processor, to cause the apparatus at least to configure the user equipment to be prevented from generating or sending a beam management report unless a 'drx-InactivityTimer' is running.

17. The apparatus according to claim 11, wherein when configuring, the at least one memory and computer program code are configured, with the at least one processor, to cause the apparatus at least to configure the user equipment to be prevented from generating or sending a beam management report when an 'onDurationTimer' is running.

18. The apparatus according to claim 11, wherein when configuring, the at least one memory and computer program code are configured, with the at least one processor, to cause the apparatus at least to configure the beam management report to be of limited form or size during the configured timer so that a limited number of beams are reported.

19. The apparatus according to claim 11, wherein the at least one memory and computer program code are further configured, with the at least one processor, to cause the apparatus at least to provide the user equipment with a medium access control or physical downlink control channel order to reset the configured timer to prolong the time the user equipment is prohibited to send a report or to skip the configured timer and be allowed to generate the beam management report.

20. The apparatus according to claim 11, wherein the at least one memory and computer program code are further configured, with the at least one processor, to cause the apparatus at least to use uplink grant of sufficient size to poll the user equipment to provide the beam management report.

21. An apparatus, comprising:
at least one processor; and
at least one memory comprising computer program code,
the at least one memory and computer program code configured, with the at least one processor, to cause the apparatus at least to
receive a configuration for a timer that is started when a user equipment active time according to a discontinuous reception cycle starts; and
while the timer is running, prevent the apparatus from generating a beam management report autonomously.

22. The apparatus according to claim 21, wherein the at least one memory and computer program code are further configured, with the at least one processor, to cause the apparatus at least to:
receive a valid uplink grant from a network; and
generate the beam management report and send the beam management report in uplink after the configured timer expires.

23. The apparatus according to claim 22, wherein when sending, the at least one memory and computer program code are configured, with the at least one processor, to cause the apparatus at least to send the beam management report piggybacked with other data using a medium access control (MAC) control element (CE).

24. The apparatus according to claim 22, wherein when sending, once the configured timer expires and the user equipment is still on active time monitoring physical downlink control channel, the at least one memory and computer program code are configured, with the at least one processor, to cause the apparatus at least to send at least one of the beam management measurement report or a scheduling request to obtain uplink resources.

25. The apparatus according to claim 21, wherein the at least one memory and computer program code are further configured, with the at least one processor, to cause the apparatus at least to receive a medium access control (MAC) or physical downlink control channel (PDCCH) order to reset the timer to prolong the time the apparatus is prohibited from sending the beam management report, or to skip the timer to be allowed to generate the beam management report.

* * * * *